United States Patent
Phan (10) Patent No.: US 11,156,008 B2
(45) Date of Patent: Oct. 26, 2021

(54) COLLAPSIBLE GUARDRAIL

(71) Applicant: The Boeing Company, Chicago, IL (US)

(72) Inventor: Tuan-Vu T. Phan, Chicago, IL (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 16/199,474

(22) Filed: Nov. 26, 2018

(65) Prior Publication Data

US 2020/0165828 A1   May 28, 2020

(51) Int. Cl.

| | |
|---|---|
| *E04G 21/32* | (2006.01) |
| *E04G 5/14* | (2006.01) |
| *B66B 23/22* | (2006.01) |
| *E04F 11/18* | (2006.01) |
| *E01F 15/04* | (2006.01) |

(52) U.S. Cl.
CPC ......... *E04G 21/3228* (2013.01); *E04G 5/142* (2013.01); *B66B 23/22* (2013.01); *E01F 15/0415* (2013.01); *E04F 11/1812* (2013.01)

(58) Field of Classification Search
CPC .. E04G 1/22; E04G 5/14; E04G 5/142; E04G 21/3228; E01F 15/0415
See application file for complete search history.

(56) References Cited

U.S. PATENT DOCUMENTS

| | | | | |
|---|---|---|---|---|
| 854,253 | A * | 5/1907 | Stoops | E04G 5/04 182/229 |
| 1,222,200 | A * | 4/1917 | Grandinetti | B66F 11/04 182/148 |
| 3,666,045 | A * | 5/1972 | Olsen | B61D 19/023 182/20 |
| 4,371,056 | A * | 2/1983 | Anglade | E06C 5/02 182/106 |
| 5,921,531 | A * | 7/1999 | Early | B61D 7/00 105/437 |
| 6,045,157 | A * | 4/2000 | Poulin | B60R 3/005 182/113 |
| 6,191,886 | B1 * | 2/2001 | Sinkoff | G03B 21/58 160/24 |
| 6,457,508 | B1 * | 10/2002 | Tomita | E04F 10/0618 135/88.12 |
| 9,481,314 | B2 * | 11/2016 | Levi | B60R 9/058 |
| 9,745,762 | B2 * | 8/2017 | Moran | E04G 21/3228 |

(Continued)

FOREIGN PATENT DOCUMENTS

FR    2661932 A1 * 11/1991   ......... E04G 21/3223

*Primary Examiner* — Colleen M Chavchavadze
(74) *Attorney, Agent, or Firm* — McDonnell Boehnen Hulbert & Berghoff LLP (57) ABSTRACT

The present disclosure relates to systems and methods involving collapsible guardrails. An example system includes a top rail, a mid rail, an enclosure, and at least two posts. Each post includes an upper primary member, a lower primary member, an upper secondary member, and a lower secondary member. The upper primary member and the lower primary member are slidably coupled to at least one slot in the mid rail. The upper secondary member is rotatably coupled to the upper primary member and the lower secondary member is rotatably coupled to the lower primary member. The upper primary member is further coupled to the top rail and the lower primary member is coupled to the enclosure.

19 Claims, 10 Drawing Sheets

(56) References Cited

U.S. PATENT DOCUMENTS

| | | | |
|---|---|---|---|
| 10,184,256 B2 * | 1/2019 | Melic | E04G 25/08 |
| 10,724,257 B2 * | 7/2020 | Moran | E04G 21/3228 |
| 10,875,456 B2 * | 12/2020 | Beam, IV | B66F 11/044 |
| 2003/0020253 A1 * | 1/2003 | Bosman et al. | B60R 3/005 |
| | | | 280/164.1 |
| 2013/0119651 A1 * | 5/2013 | Conny | B60R 21/02 |
| | | | 280/837 |
| 2015/0176286 A1 * | 6/2015 | Suggate | E04F 11/002 |
| | | | 14/69.5 |
| 2018/0135307 A1 * | 5/2018 | Moran | E04F 11/1865 |

* cited by examiner

COLLAPSIBLE GUARDRAIL

FIELD

The present disclosure generally relates to systems and methods involving adjustable and/or movable guardrails.

BACKGROUND

During their manufacture in an airplane production facility, aircraft move along the production line between different stages of assembly. This periodic (e.g., daily) movement is called "pulsing" the production line.

In some stages of assembly, movable deck platforms may provide personnel access to elevated portions of the airplane. To avoid falls from the movable deck platform, such platforms may include various guardrails.

Currently, prior to pulsing the production line, some guardrails on the movable deck platforms need to be manually removed (e.g., by hand) so they do not impede the progress of airplanes as they move along the production line. Once a new airplane is in a proper position along the production line, the guardrails are manually reinstalled so as to protect personnel from various hazards.

Frequent handling of the removable guardrails sections, which can weigh 40 pounds, or more, can lead to repetitive lift injuries. Furthermore, personnel who install and remove the guardrails can be at particular risk of falling.

SUMMARY

In an aspect, a collapsible rail system is described. The system includes a top rail having a first top rail end and a second top rail end and a mid rail that includes at least one slot, a first mid rail end, and a second mid rail end. The system also includes an enclosure having a first enclosure end and a second enclosure end and at least two posts. Each post includes an upper primary member, a lower primary member, an upper secondary member, and a lower secondary member. The upper primary member and the lower primary member are slidably coupled to the mid rail by way of a primary pin that engages the at least one slot. The upper secondary member is rotatably coupled to the upper primary member and the lower secondary member is rotatably coupled to the lower primary member. The upper primary member is further coupled to the first top rail end or the second top rail end. The lower primary member is further coupled to the first enclosure end or the second enclosure end. The upper secondary member and the lower secondary member are rotatably coupled to the first mid rail end or the second mid rail end.

In another aspect, a movable deck platform is described. The movable deck platform includes a walking surface and a top rail having a first top rail end and a second top rail end. The movable deck platform also includes a mid rail having at least one slot, a first mid rail end, and a second mid rail end. The movable deck platform also includes an enclosure coupled at or below the walking surface and having a first enclosure end and a second enclosure end. The movable deck platform also includes at least two posts, each post including an upper primary member, a lower primary member, an upper secondary member, and a lower secondary member. The upper primary member and the lower primary member are slidably coupled to the mid rail by way of a primary pin that engages the at least one slot. The upper secondary member is rotatably coupled to the upper primary member and the lower secondary member is rotatably coupled to the lower primary member. The upper primary member is further coupled to the first top rail end or the second top rail end and the lower primary member is further coupled to the first enclosure end or the second enclosure end. The upper secondary member and the lower secondary member are rotatably coupled to the first mid rail end or the second mid rail end.

In a further aspect, a method is described. The method includes receiving information indicative of a desired configuration or a desired movement of a collapsible rail system. The collapsible rail system further includes at least one actuator. The method also includes foldably adjusting the collapsible rail system according to the desired configuration or the desired movement by adjusting the at least one actuator.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

The present disclosure relates to collapsible guardrails that can retract and extend from a floor-mounted tray without requiring manual lifting, removal, or replacement. In some embodiments, the collapsible guardrails could be manually adjusted from a stowed or retracted configuration to an extended or raised configuration, or vice versa. In other embodiments, the collapsible guardrails could be raised and/or lowered in an automated fashion without exposing personnel to injury risks. The systems and methods for folding guardrails could be implemented on movable deck platforms or in other similar scenarios. In such examples, tooling personnel can retract and extend the guardrails before and after pulsing of the production line instead of manually lifting, carrying, and installing the guardrails onto the deck platforms.

In some embodiments, the collapsible guardrails can be extended and retracted using electric linear actuators that may be controlled with a hand remote. Furthermore, the collapsible guardrails could retract into a frame that encloses a track embedded at or below the deck surface.

In the closed position, the collapsible guardrails lie flush into the frame, and the torsion spring loaded hinges rotate the cover door on top of the frame to cover it. When the collapsible guardrail is installed below the deck surface, and is in the closed position, the cover door creates a flat surface in line (e.g., flush) with the deck surface. In the open position, the cover door is rotated vertically against the collapsible guardrail creating a toe-guard and preventing foreign objects and/or debris from falling into the frame.

In some embodiments, the guardrail system described herein complies with various federal and state safety guidelines, such as, but not limited to Occupational Safety and Health Administration (OSHA) Regulation 1910.29 (Fall protection systems). Other United States and international safety standards could be addressed by way of the present guardrail system as well.

II. Example Systems

Figure 1:
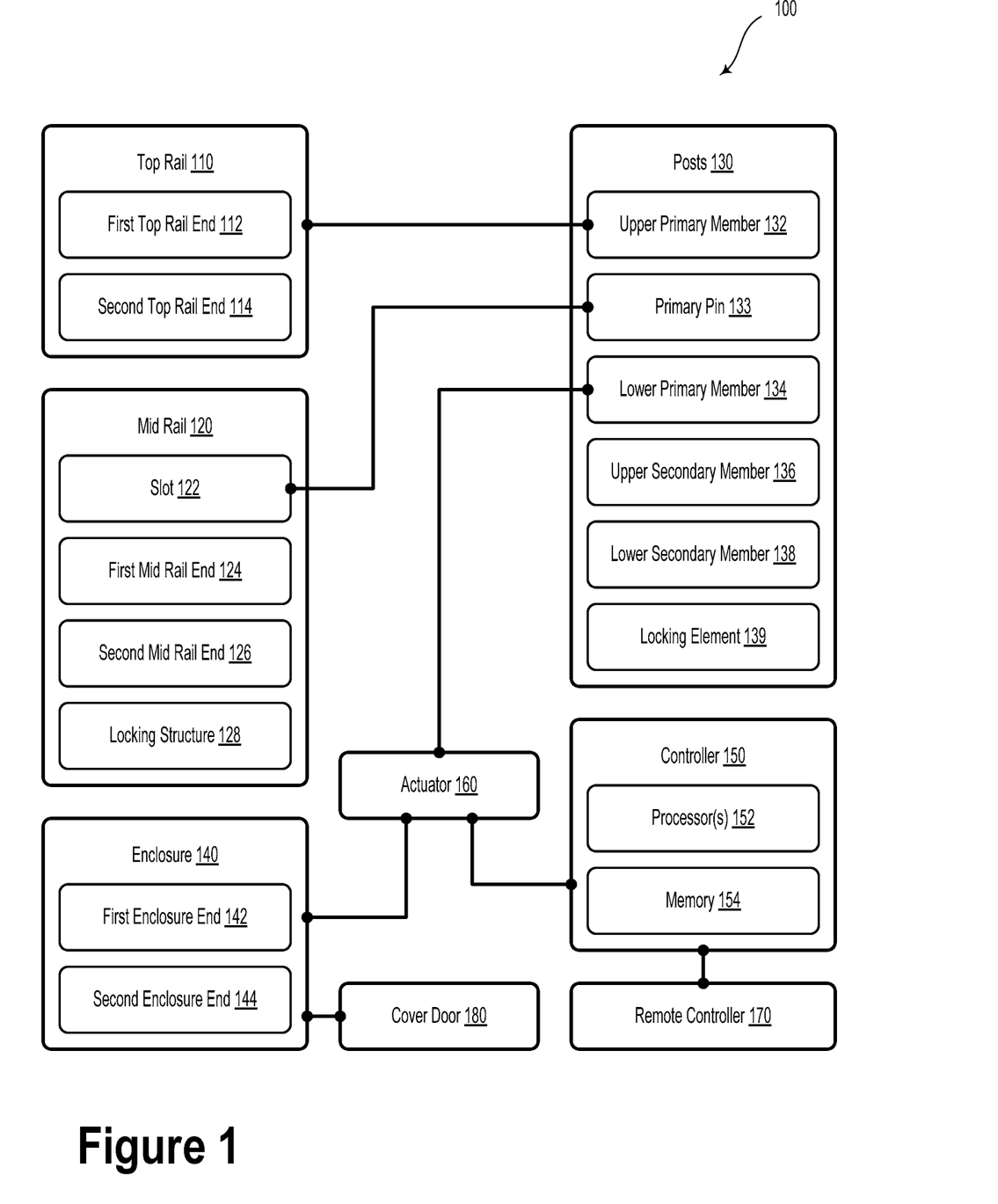
FIG. 1 illustrates a system, according to an example implementation.

FIG. 1 illustrates a system 100, according to an example implementation. The system 100 includes a top rail 110, a mid rail 120, a plurality of posts 130, and an enclosure 140. The system 100 also includes at least one actuator 160, a cover door 180, controller 150, and an optional remote controller 170. In some embodiments, system 100 could include a collapsible guard rail system.

In some embodiments, various elements of system 100, such as the top rail 110, the mid rail 120, and/or the posts 130 could be formed from round and/or square metal tubing, rods, or bars. It will be understood that elements of system 100 could be formed from other materials, such as aluminum, steel, carbon fiber, plastic, and/or another type of rigid and/or structural material.

The top rail 110 includes a first top rail end 112 and a second top rail end 114. The mid rail 120 includes at least one slot 122, a first mid rail end 124, and a second mid rail end 126. The enclosure 140 includes a first enclosure end 142 and a second enclosure end 144.

The posts 130 could include at least two posts. In some embodiments, the posts could each include an upper primary member 132, a lower primary member 134, an upper secondary member 136, and a lower secondary member 138. The upper primary member 132 and the lower primary member 134 are slidably coupled to the mid rail 120 by way of a primary pin 133 that engages the at least one slot 122.

The upper secondary member 136 is rotatably coupled to the upper primary member 132. The lower secondary member 138 is rotatably coupled to the lower primary member 134. The upper primary member 132 is further coupled to the first top rail end 112 or the second top rail end 114. The lower primary member 134 is further coupled to the first enclosure end 142 or the second enclosure end 144. The upper secondary member 136 and the lower secondary member 138 are rotatably coupled to the first mid rail end 124 or the second mid rail end 126.

As described herein, "rotatably coupled" or "rotatably coupling" could include coupling two elements of system 100 by way of at least one of: (i) a rotary bearing; or (ii) at least one rotary bushing and a stripper bolt. Other types of flexible and/or adjustable couplings are contemplated to join such rotatably coupled parts. It will be understood that other types of rotatable couplings are contemplated herein. For example, without limitation, various parts described herein could be rotatably coupled by way of a plain bearing (e.g., sleeve bearing/bushing), a ball bearing, roller bearing, etc.

As an example, the upper secondary member 136 could be rotatably coupled to the upper primary member 132 by way of at least one of: a clevis pin, a rotary bearing, or a rotary bushing. The lower secondary member 138 is rotatably coupled to the lower primary member 134 by similar devices. In such a manner, various portions of the system 100 could be configured to rotate with respect to the rotatably couplings. In so doing, the system 100 could be controllably raised or retracted in a foldable manner.

In some embodiments, the mid rail 120 also includes a locking structure 128. The locking structure 128 could include, for example, a raised and/or slotted surface along the mid rail 120. In some embodiments, the mid rail 120 could include a plurality of locking structures along the mid rail 120 so that the collapsible rail system could be locked in various positions corresponding with different top rail heights. Although the locking structure 128 is illustrated herein as being along a top surface of the mid rail 120, it will be understood that the locking structure 128 could be located elsewhere.

In some scenarios, at least one post of the posts 130 could include a locking element 139. For example, the locking element 139 could be rotatably coupled to the primary pin 133. The locking element 139 may be operable to engage the locking structure 128 so as to lock or otherwise statically secure the at least one post. The locking element 139 may be further operable to disengage the locking structure 128 so as to unlock the at least one post.

The controller 150 could have at least one processor 152 and a memory 154. The at least one processor 152 may include, for instance, a microprocessor, an application-specific integrated circuit (ASIC), or a field-programmable gate array (FPGA). Other types of processors, circuits, computers, or electronic devices configured to carry out software instructions are contemplated herein.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory so as to carry out various operations and method steps/blocks described herein. The instructions may be stored in a permanent or transitory manner in the memory.

As an example, the controller 150 could be configured to carry out operations such as causing the locking element 139 to engage the locking structure 128 and/or causing the locking element 139 to disengage the locking structure 128.

In some embodiments, the at least one actuator 160 could be coupled between the enclosure 140 and the lower primary member 134. The at least one actuator 160 could include a pneumatic linear actuator, a hydraulic linear actuator, or a screw-type linear actuator. Other types of actuators are contemplated and possible within the scope of the present disclosure. For example, the at least one actuator 160 could include an electric ball-screw linear actuator. Such an actuator could have an actuator arm with a throw range between 100 mm to 300 mm. Other throw ranges are possible and contemplated.

The actuator 160 could be communicatively coupled to the controller 150 and/or the remote controller 170. It will be understood that other arrangements of the actuator 160 with respect to enclosure 140, posts 130, and the walking surface are possible and contemplated so as to controllably adjust the configuration of the system 100 as described herein.

In embodiments that include the controller 150, the operations could also include causing the at least one actuator 160 to raise or lower the system 100. That is, controller 150 could provide one or more signals that could cause the actuator 160 to extend or retract so as to adjust the position (e.g., the height) of various components of the system 100.

In some embodiments that involve the remote controller 170, the controller 150 could be configured to carry out operations such as receiving a raise command or a lower command from the remote controller 170. In such scenarios, causing the at least one actuator 160 to raise or lower the system 100 could be performed in response to receiving the raise command or the lower command from the remote controller 170.

The remote controller 170 could include a wired remote controller having a user interface (e.g., one or more buttons, a touchscreen, etc.). In some embodiments, the user interface could include at least one button. In some embodiments, a user could press the at least one button to provide a command to extend or retract various elements of system 100 (e.g., the top rail 110 and other connected elements). For instance, the remote controller 170 could include an "EXTEND" button and a "RETRACT" button. In such scenarios, user interactions with such buttons could provide corresponding commands to the actuator 160 and/or controller 150 to adjust a position of the system 100.

In various embodiments, a walking surface could define a reference plane. In such scenarios, the system 100 could be installed with respect to the walking surface so as to provide an adjustable guard rail system. For example, the system 100 could include a cover door 180. The cover door 180 could be rotatably coupled to the enclosure 140 by way of a hinge (e.g., a piano hinge or another type of rotatable coupling). While the system 100 is moving into an extended configuration (e.g., raising the top rail 110), the cover door 180 could rotate about the hinge and out of the reference plane. That is, while the system 100 is in an extended configuration, the cover door 180 could act as a kick plate and/or toe guard. While the system 100 is moving into a retracted configuration (e.g., lowering the top rail 110), the cover door 180 could rotate about the hinge and into the reference plane (or substantially parallel to it), covering the enclosure 140 and retracted rail assembly. In some embodiments, the closed cover door 180 could be substantially flush with the walking surface (e.g., even with the surrounding walking surface) so as to reduce a tripping and/or fall hazard.

While some embodiments include the cover door 180 as a rotatable plate that could close over the enclosure 140, it will be understood that other arrangements of the cover door 180 and/or ways to close the enclosure 140 are possible. For example, in an example embodiment, the cover door 180 could be integrated into, or be formed from, the top rail 110. In such a scenario, lowering the top rail 110 into the enclosure 140 may close the enclosure 140. In other words, the combination of the top rail 110 and cover door 180 could be lowered to be flush with the walking surface and close the enclosure 140.

In some embodiments, the system 100 could include at least one baluster rotatably coupled between the enclosure 140 and at least one of the top rail 110 or the mid rail 120. The at least one baluster could provide a vertical barrier between the first post and the second post. In some embodiments, such balusters could be rotatably coupled to other elements of system 100 so as to foldably retract into, or extend from, the enclosure 140.

In embodiments where a walking surface defines a reference plane. An extended configuration of the system 100 could include a first post and a second post extending from the reference plane such that both the first post and the second post are substantially perpendicular to the reference plane. In such scenarios, a retracted configuration of the system 100 could include the first post and the second post being folded substantially parallel to the reference plane.

In some embodiments, the top rail 110 and/or the mid rail 120 could extends beyond a span between the first post and the second post so as to provide a wing rail. In such scenarios, the wing rail could provide a barrier and/or fall protection for areas located between multiple adjacent rail assemblies and/or outside the span between the first post and the second post.

In some embodiments, the operations of controller 150 could include adjusting a configuration of the system 100 between an extended configuration and a retracted configuration by foldably raising or lowering the system 100 with respect to the enclosure 140. It will be understood that the controller 150 could be configured to carry out operations involving multiple actuators and/or corresponding collapsible guard rail systems. For example, in some embodiments, system 100 could include a further arrangement of posts, rails, and a further actuator. In such scenarios, the controller 150 could be configured to control the actuator 160 in addition to the further actuator. As such, the controller 150 could control a plurality of collapsible guard rails.

Automatically adjusting the system 100 to the extended configuration is beneficial because the controller-based actions could take the place of, or supplement, one or more manual aircraft assembly line pulsing activities. Namely, instead of using personnel to manually install guardrails, portions of system 100 could be automatically or semi-automatically adjusted into the extended configuration with the systems and methods described herein.

Automatically adjusting the system 100 to the retracted configuration is beneficial because it could replace or reduce the need for personnel to manually remove guardrails from the deck platform during pulsing operations. Furthermore, such controller-based (e.g., automated or semi-automated) operations could prevent injuries to worker personnel, such as repetitive-use injuries and falls.

The systems described herein could additionally or alternatively include at least one limit switch (not illustrated). The at least one limit switch is configured to providing information indicative of at least a portion of the system 100 reaching a position limit. In such scenarios, the operations could include causing the actuator 160 to move the lower primary member 134 until receiving the information indicative of the lower primary member 134 reaching the position limit. In response to such scenarios, the controller 150 could stop adjusting the actuator 160, thereby stopping movement of the lower primary member 134.

The at least one limit switch could include a switch, button, or another type of sensor. The at least one limit switch could operate based on mechanical, opto-mechanical, magnetic, or optical sensing modalities. However, other types of limit switches or contact/proximity sensors are possible and contemplated.

Figure 2:
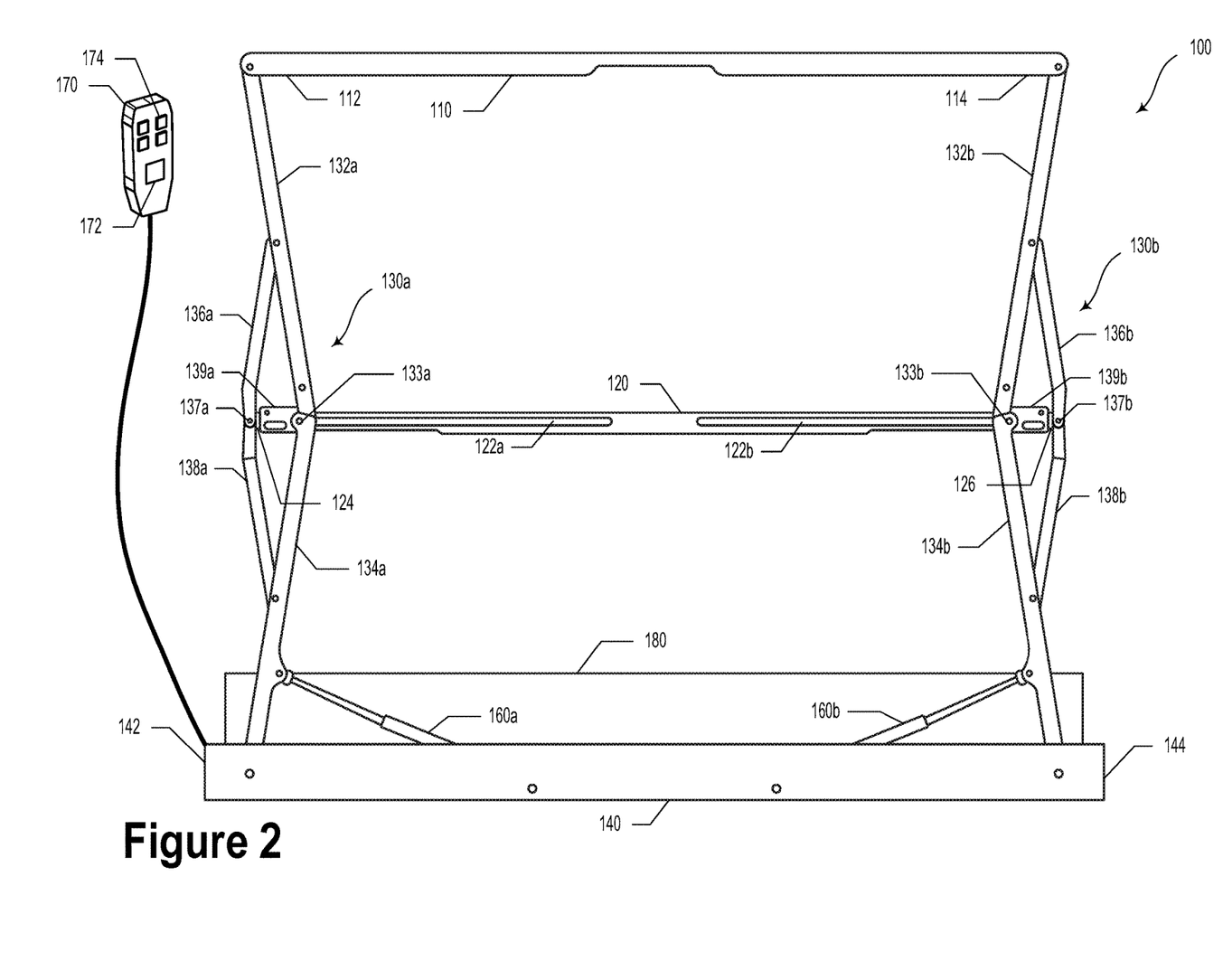
FIG. 2 illustrates a system, according to an example implementation.

FIG. 2 illustrates a system 200, according to an example implementation. It will be understood that system 200 could be similar or identical to system 100 as illustrated and described in relation to FIG. 1. FIG. 2 illustrates system 200 in an extended configuration. For example, system 200 could include top rail 110, which has a first top rail end 112 and second top rail end 114. The first top rail end 112 is rotatably coupled to an upper primary member 132*a* of a first post 130*a*. The upper primary member 132*a* is also rotatably coupled to a lower primary member 134*a* via a primary pin 133*a*, which can slide along slot 122*a* in the mid rail 120.

A first mid rail end 124 is rotatably coupled to upper secondary member 136*a* and lower secondary member 138*a* via a secondary pin 137*a*. The respective upper secondary member 136*a* and lower secondary member 138*a* are rotatably coupled to middle portions of the upper primary member 132*a* and lower primary member 134*a*, respectively.

The respective second ends of the top rail 110 and the mid rail 120 are coupled to respective elements of the second post 130*b*. For example, the second top rail end 114 is rotatably coupled to an upper primary member 132*b* of a second post 130*b*. The upper primary member 132*b* is also rotatably coupled to a lower primary member 134*b* via a primary pin 133*b*, which can slide along slot 122*b* in the mid rail 120. A second mid rail end 126 is rotatably coupled to upper secondary member 136*b* and lower secondary member 138*b* via a secondary pin 137*b*. The respective upper secondary member 136*b* and lower secondary member 138*b* are rotatably coupled to middle portions of the upper primary member 132*b* and lower primary member 134*b*, respectively.

The lower primary members 134*a* and 134*b* could be respectively coupled to a first enclosure end 142 and a second enclosure end 144 of an enclosure 140. The enclosure 140 could include, or could be coupled to, a cover door 180. In some embodiments described herein, elements of system 100 could be lowered or collapsed into the enclosure 140 so as to provide compact stowage. Such elements of system 100 could be raised for normal platform guard rail operation.

In some embodiments, the cover door 180 of the enclosure 140 could be configured to open (e.g., rotate to a substantially vertical position) when the system 100 is in an extended or partially-extended configuration. In such an arrangement, the cover door 180 could provide a toe board and/or a kick plate.

When the system 100 is in a retracted configuration, the cover door 180 could close over an opening of the enclosure 140. In such a fashion, the cover door 180 could prevent debris and other foreign objects from falling into the enclosure 140 and/or through the deck platform.

In some embodiments, actuators 160*a* and 160*b* could be coupled between the enclosure 140 and the respective lower primary members 134*a* and 134*b*.

As illustrated in FIG. 2, system 200 could include a remote controller 170. In such scenarios, the remote controller 170 could include a plurality of buttons 174 and a user interface 172. In other embodiments, the remote controller could control different types of movable and/or foldable guardrails.

While FIG. 2 illustrates one possible location for the remote controller 170, it will be understood that other locations are possible and contemplated. For example, the remote controller 170 could be located near the enclosure 140 in the form of a footswitch or pedal. Alternatively, the remote controller 170 could be located at a control room or on a centralized control panel. In some embodiments, the remote controller 170 could be realized in the form of a mobile computing device, such as a tablet device, a smartphone, or a laptop computer.

Figure 3:
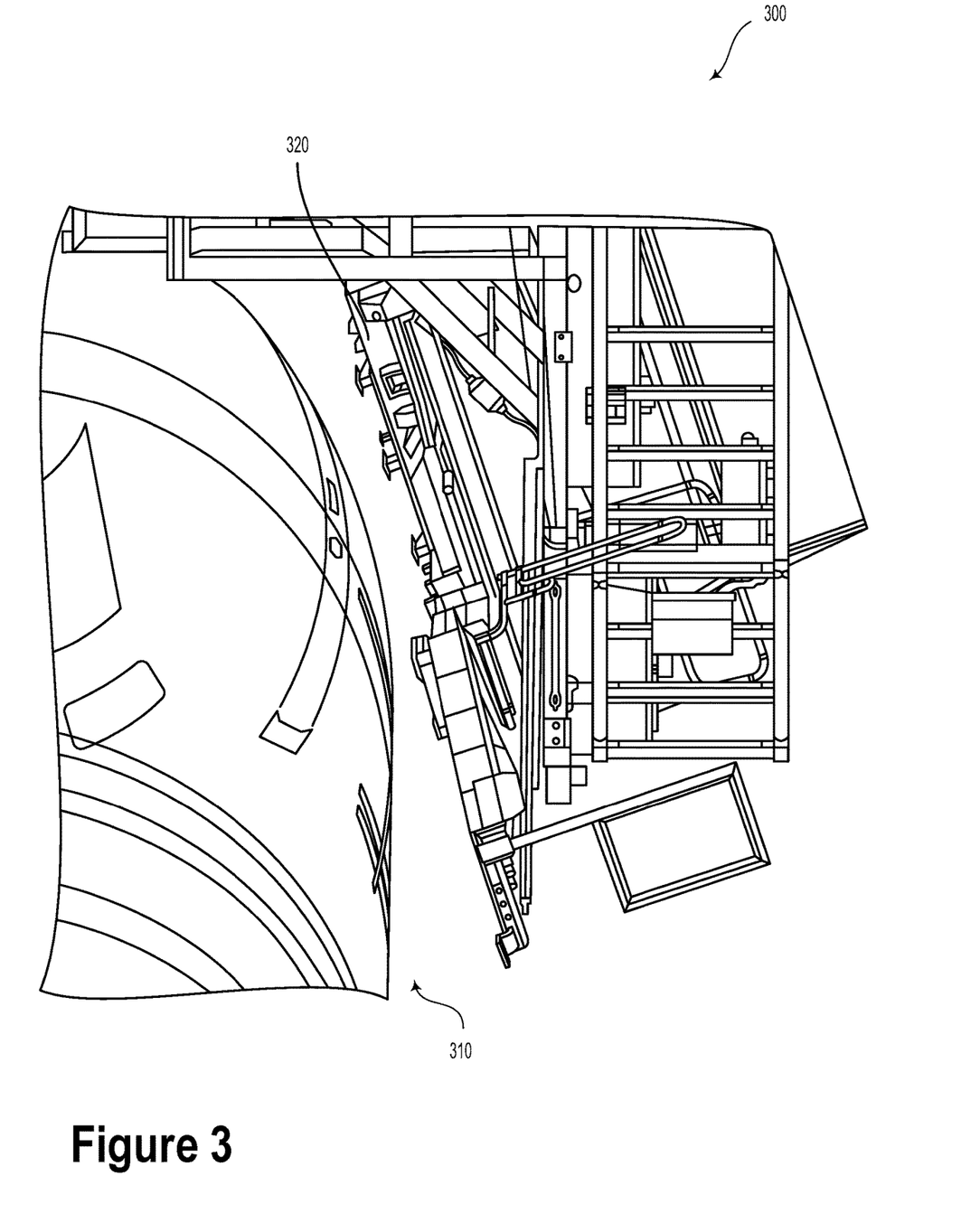
FIG. 3 illustrates a movable deck platform, according to an example implementation.

FIG. 3 illustrates a movable deck platform 300, according to an example implementation. The movable deck platform 300 could include a platform 320 that is operable to rotate or fold so as to provide clearance for an aircraft 310 to move along an aircraft assembly line. Other types of movable deck platforms are possible and contemplated herein. In some embodiments, systems 100 or 200 could be incorporated into the movable deck platform 300. For example, the top rail 110, mid rail 120, and the posts 130 described herein could be foldably retracted so as to provide clearance 330 so the platform 320 could be rotated up and away from the aircraft 310.

After "pulsing" the aircraft assembly line, the movable deck platform 300 could rotate to a substantially horizontal position to provide a walking surface/working platform for personnel. Once rotated into a substantially horizontal position, the collapsible guardrails described herein could be adjusted to their extended configuration, protecting personnel who may work on the movable deck platform 300.

In some embodiments, the movable deck platform 300 includes a walking surface (e.g., a work platform) and a guard rail that could include, for example, a top rail (e.g., top rail 110) having a first top rail end and a second top rail end. The movable deck platform 300 also include a mid rail (e.g., mid rail 120), which includes at least one slot, a first mid rail end, and a second mid rail end.

In some embodiments, the movable deck platform 300 includes an enclosure (e.g., enclosure 140) coupled at or below the walking surface having a first enclosure end and a second enclosure end. Similarly or identically to system 100, the movable deck platform 300 also includes at least two posts, each of which could include an upper primary member, a lower primary member, an upper secondary member, and a lower secondary member.

The upper primary member and the lower primary member are slidably coupled to the mid rail by way of a primary pin that engages the at least one slot. The upper secondary member is rotatably coupled to the upper primary member and the lower secondary member is rotatably coupled to the lower primary member. The upper primary member is further coupled to the first top rail end or the second top rail end and the lower primary member is further coupled to the first enclosure end or the second enclosure end. The upper secondary member and the lower secondary member are rotatably coupled to the first mid rail end or the second mid rail end.

In some embodiments, the movable deck platform 300 could be operated in an extended configuration. The extended configuration could include a first post and a second post extending from the walking surface such that both the first post and the second post are substantially perpendicular to the walking surface. Additionally or alternatively, the movable deck platform 300 could be operated in a retracted configuration. The retracted configuration could include the first post and the second post disposed substantially parallel to the walking surface.

In some embodiments, the movable deck platform 300 could include a locking structure on the mid rail. In such scenarios, at least one post could include a locking element. The locking element is rotatably coupled to the primary pin and the locking element is operable to engage the locking structure so as to lock the at least one post. Furthermore, the locking element could be configured to operably disengage the locking structure so as to unlock the at least one post. In various embodiments, the movable deck platform 300 also includes a controller (e.g., controller 150) having at least one processor and a memory. The controller is configured to execute instructions so as to carry out operations, such as: causing the locking element to engage the locking structure and causing the locking element to disengage the locking structure.

Figure 4:
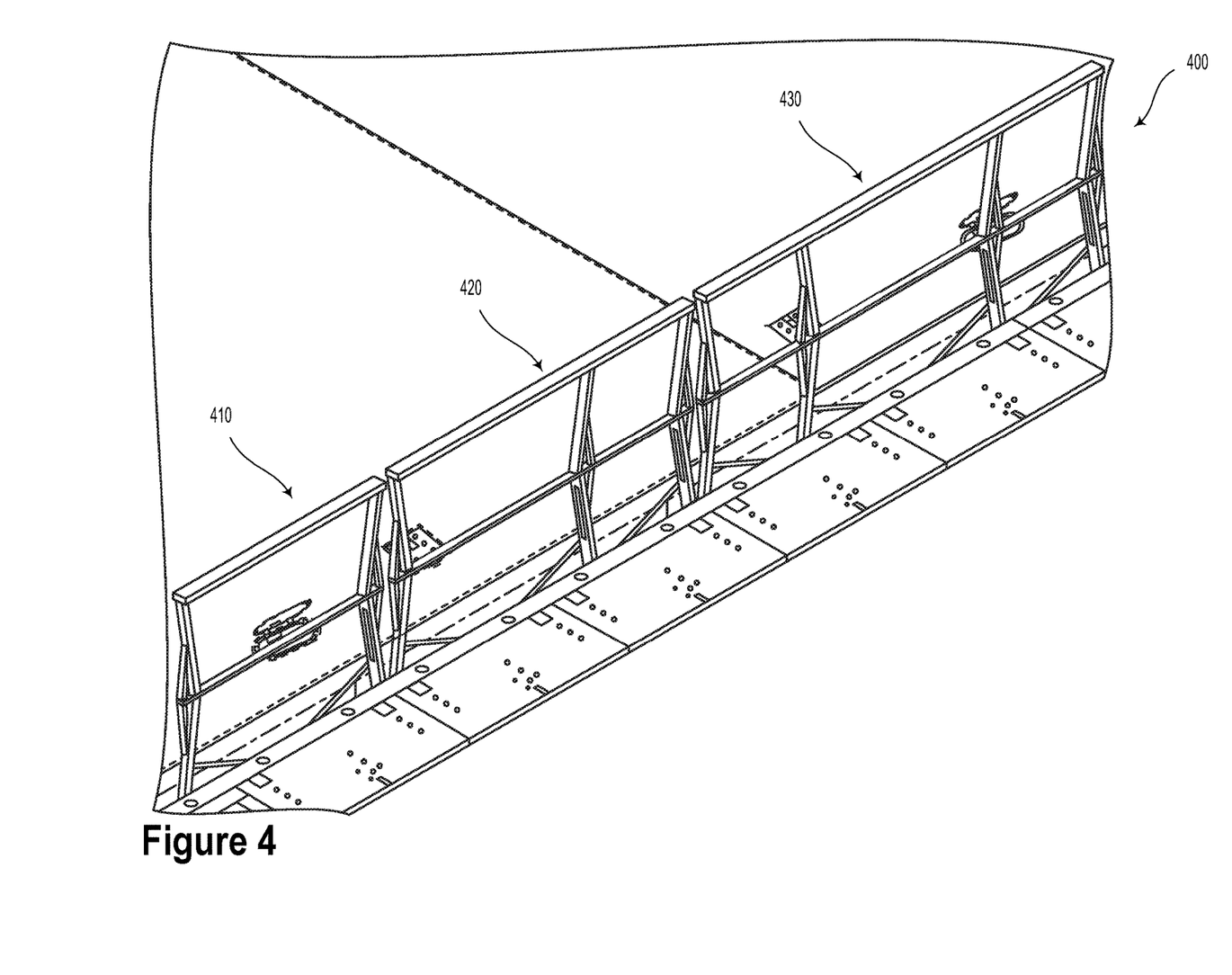
FIG. 4 illustrates an operating scenario, according to an example implementation.
Figure 5:
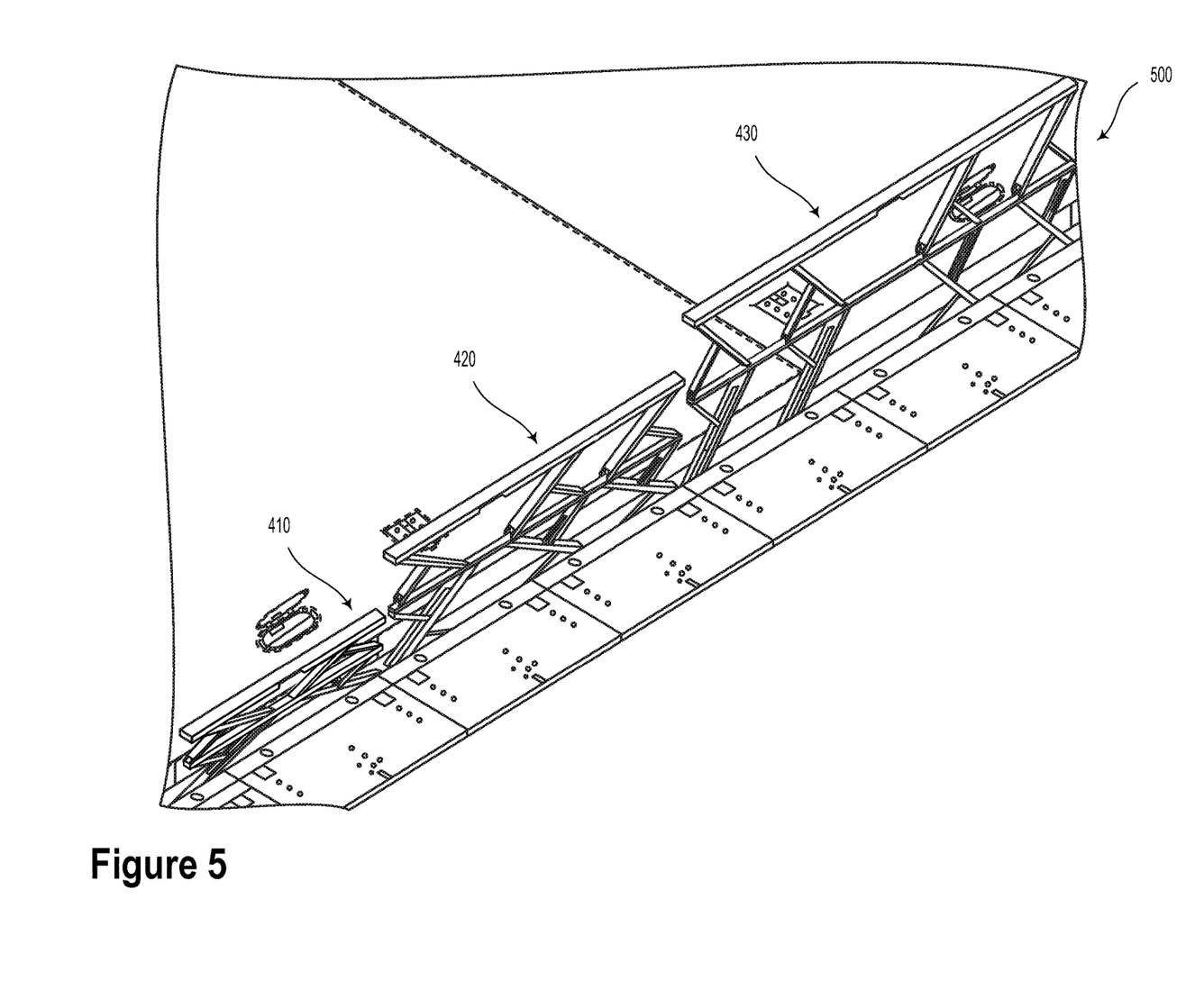
FIG. 5 illustrates an operating scenario, according to an example implementation.
Figure 6:
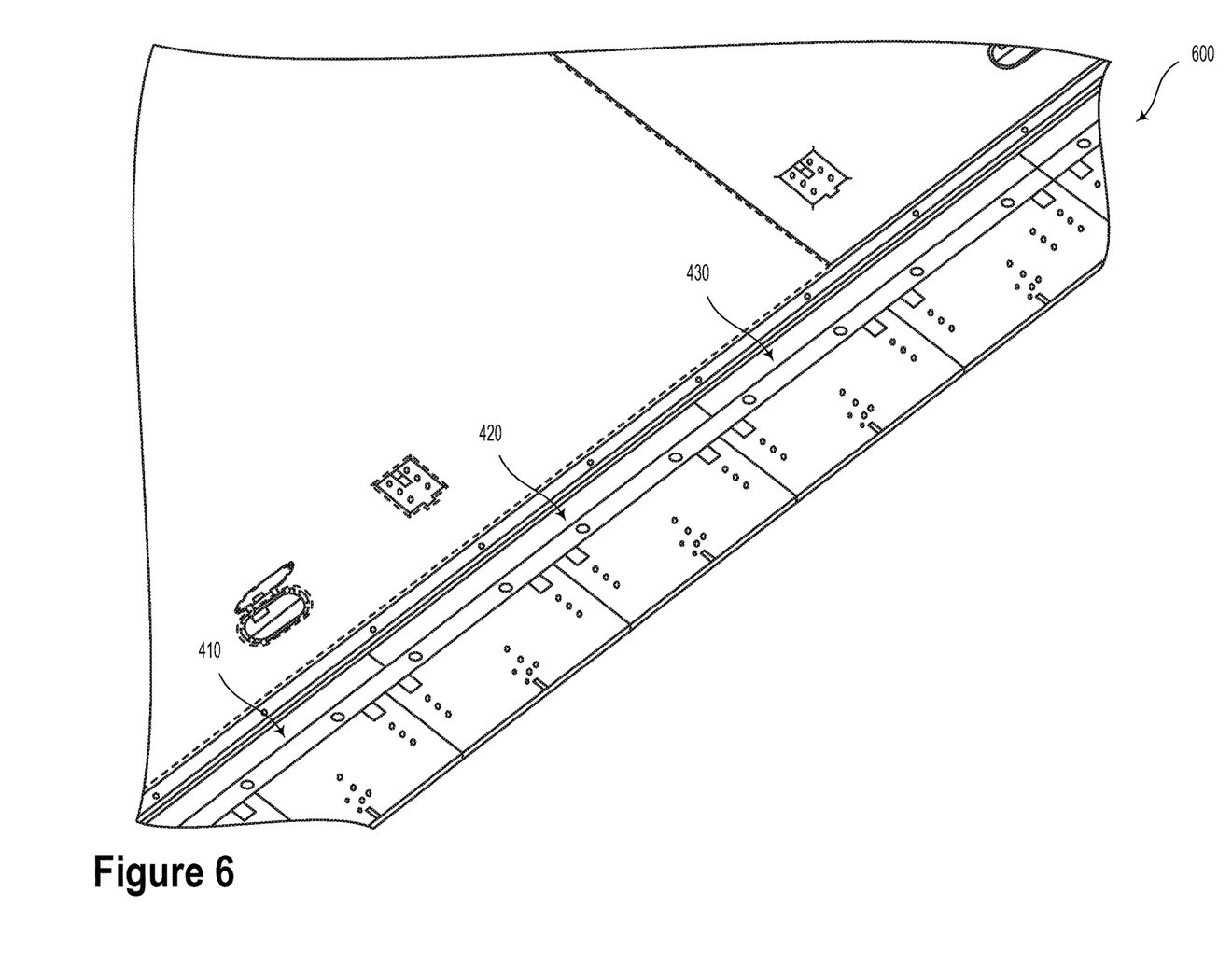
FIG. 6 illustrates an operating scenario, according to an example implementation.

In some embodiments, the movable deck platform 300 could include a plurality of collapsible guard rail systems (e.g., systems 410, 420, and 430 as illustrated and described in relation to FIGS. 4, 5, and 6).

FIGS. 4, 5, and 6 illustrate three different operating scenarios 400, 500, and 600, each of which illustrates a different configuration of the systems described herein. FIG. 4 illustrates an operating scenario 400 in which three different collapsible rail systems 410, 420, and 430 are in a fully extended configuration. That is the top rail of each collapsible rail system is fully raised with respect to the walking surface. System 410 is a "two-post" collapsible rail system (e.g., system 100 with two posts 130), system 420 is a "three-post" collapsible rail system (e.g., system 100 with three posts 130), and system 430 is a "four-post" collapsible rail system (e.g., system 100 with four posts 130). It will be understood that other configurations and numbers of posts are considered and possible within the scope of the present disclosure. In the extended configuration illustrated in FIG. 4, the cover door (e.g., cover door 180) could be extended upward or substantially perpendicular to the walking surface.

FIG. 5 illustrates an operating scenario 500, according to an example implementation. FIG. 5 illustrates each of the "two-post" collapsible rail system 410, the "three-post" collapsible rail system 420, and the "four-post" collapsible rail system 430 as being in a partially extended configuration (e.g., between fully extended and retracted configurations). Specifically, the partially extended configuration could include the upper primary member 132 and lower primary member 134 as being partially folded. By folding the upper primary member 132 and lower primary member 134, the top rail 110 can be lower (with respect to the walking surface) compared to the fully extended configuration.

FIG. 6 illustrates an operating scenario 600, according to an example implementation. FIG. 6 illustrates each of the "two-post" collapsible rail system 410, the "three-post" collapsible rail system 420, and the "four-post" collapsible rail system 430 as being in a retracted configuration. The retracted configuration could include the cover door 180 rotating to a flush position with respect to the walking surface. By closing the cover door 180 over the other elements of the collapsible rail system, a trip/fall hazard risk can be beneficially reduced.

Figure 7A:
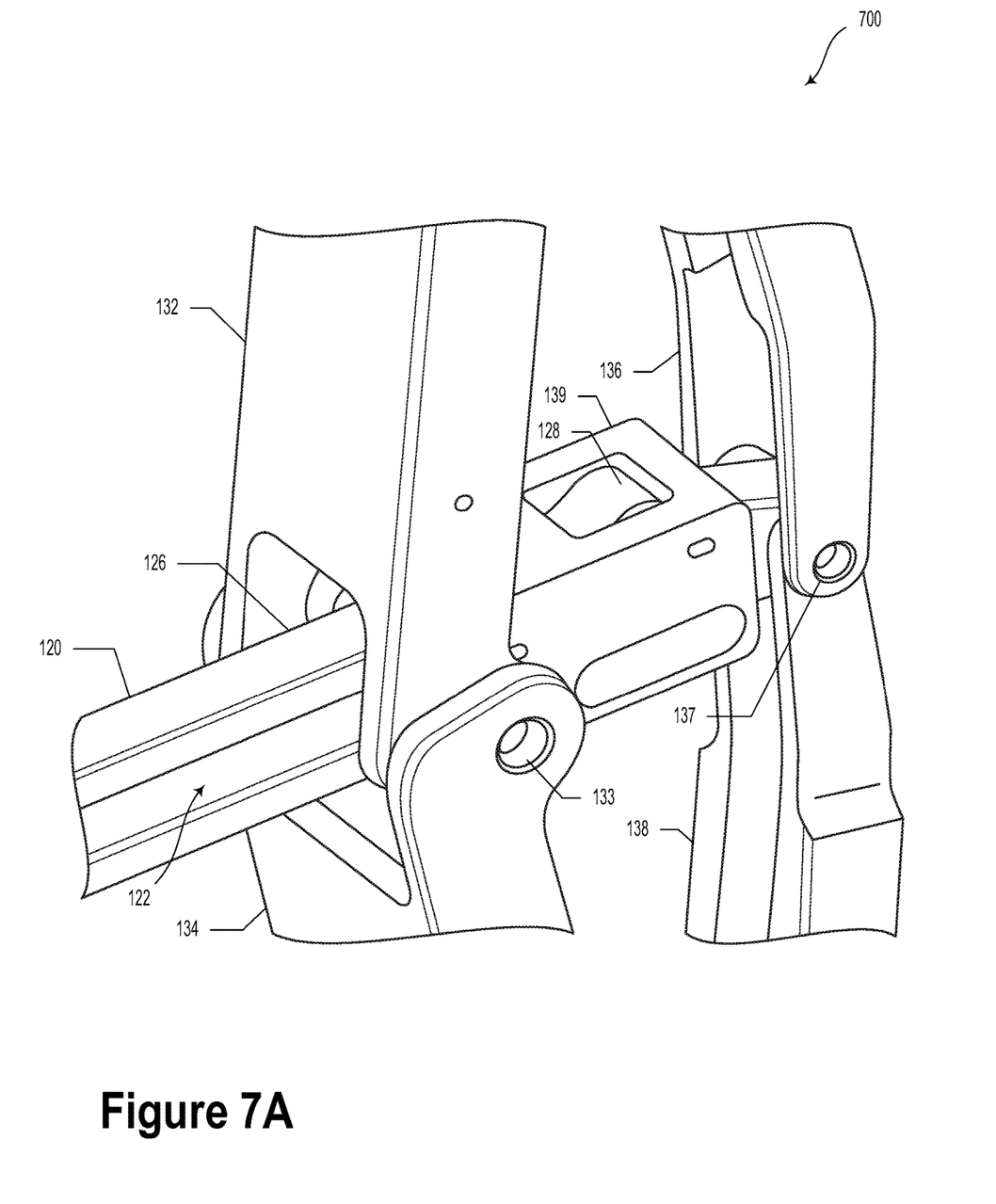
FIG. 7A illustrates a portion of the system of FIG. 2, according to an example implementation.

FIG. 7A illustrates a portion 700 of the system 200 of FIG. 2, according to an example implementation. Portion 700 includes the upper primary member 132 and the lower primary member 134 which are coupled via primary pin 133. The primary pin 133 feeds through the slot 122 so that the upper primary member 132 and the lower primary member 134 can collapsibly fold inward along the mid rail 120.

Portion 700 also includes the locking element 139, which is rotatably coupled to the primary pin 133 and which can rotate so as to operably engage the locking structure 128 along the mid rail 120. The upper secondary member 136 and the lower secondary member 138 are coupled to the second mid rail end 126 of the mid rail 120 via secondary pin 137.

Figure 7B:
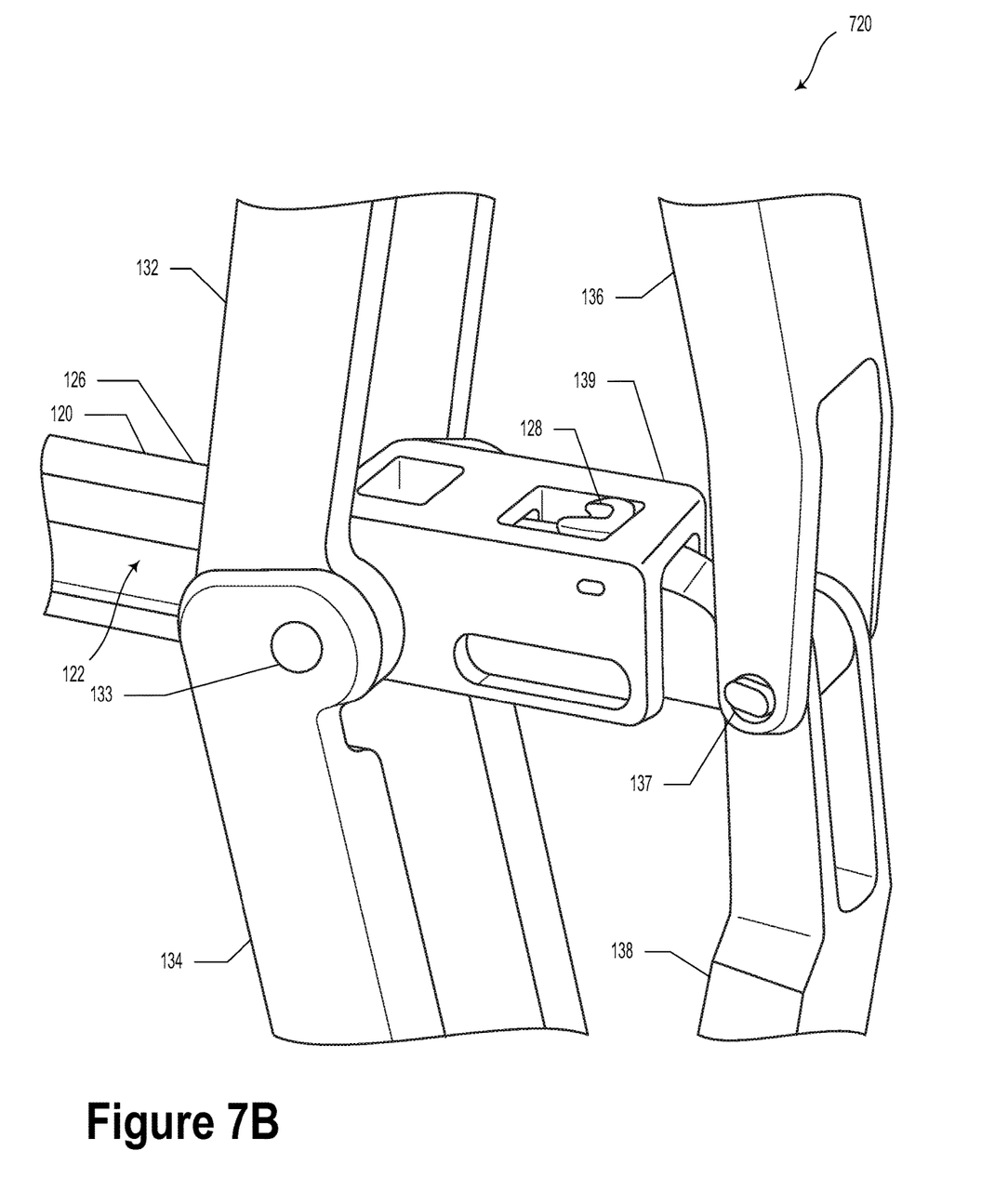
FIG. 7B illustrates a portion of the system of FIG. 2, according to an example implementation.

FIG. 7B illustrates an alternative view of a portion 720 of the system 200 of FIG. 2, according to an example implementation. Among other elements, portion 720 also includes locking element 139 in a "locked" position. For example, locking element 139 is illustrated as engaging the locking structure 128 so that the primary pin 133 and the rest of system 200 are locked in an extended configuration.

Figure 8:
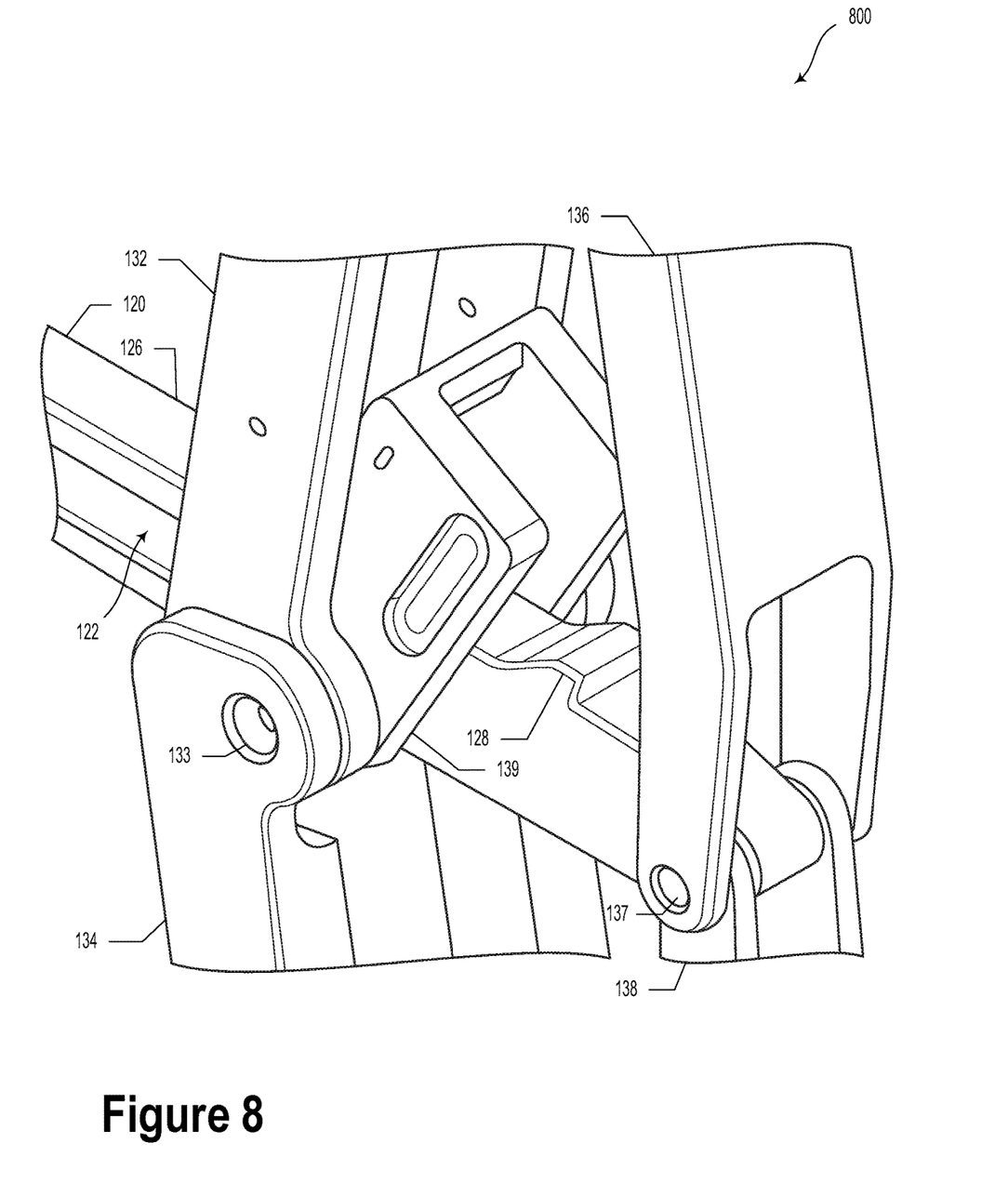
FIG. 8 illustrates a portion of the system of FIG. 2, according to an example implementation.

FIG. 8 illustrates a portion 800 of the system 200 of FIG. 2, according to an example implementation. Portion 800 includes similar elements to that of FIGS. 7A and 7B. However, FIG. 8 illustrates locking element 139 as being rotated upward into an "unlocked" position. In such a scenario, the locking element 139 is not physically engaged with the locking structure 128. As illustrated, the primary pin 133, upper primary member 132, and lower primary member 134 can slide along the mid rail 120 via slot 122. When the locking element 139 is in the unlocked position, system 200 may be adjusted to a retracted or lowered configuration. For example, in such scenarios, the system 200 can be fully retracted and stowed within the enclosure 140.

III. Example Methods

Figure 9:
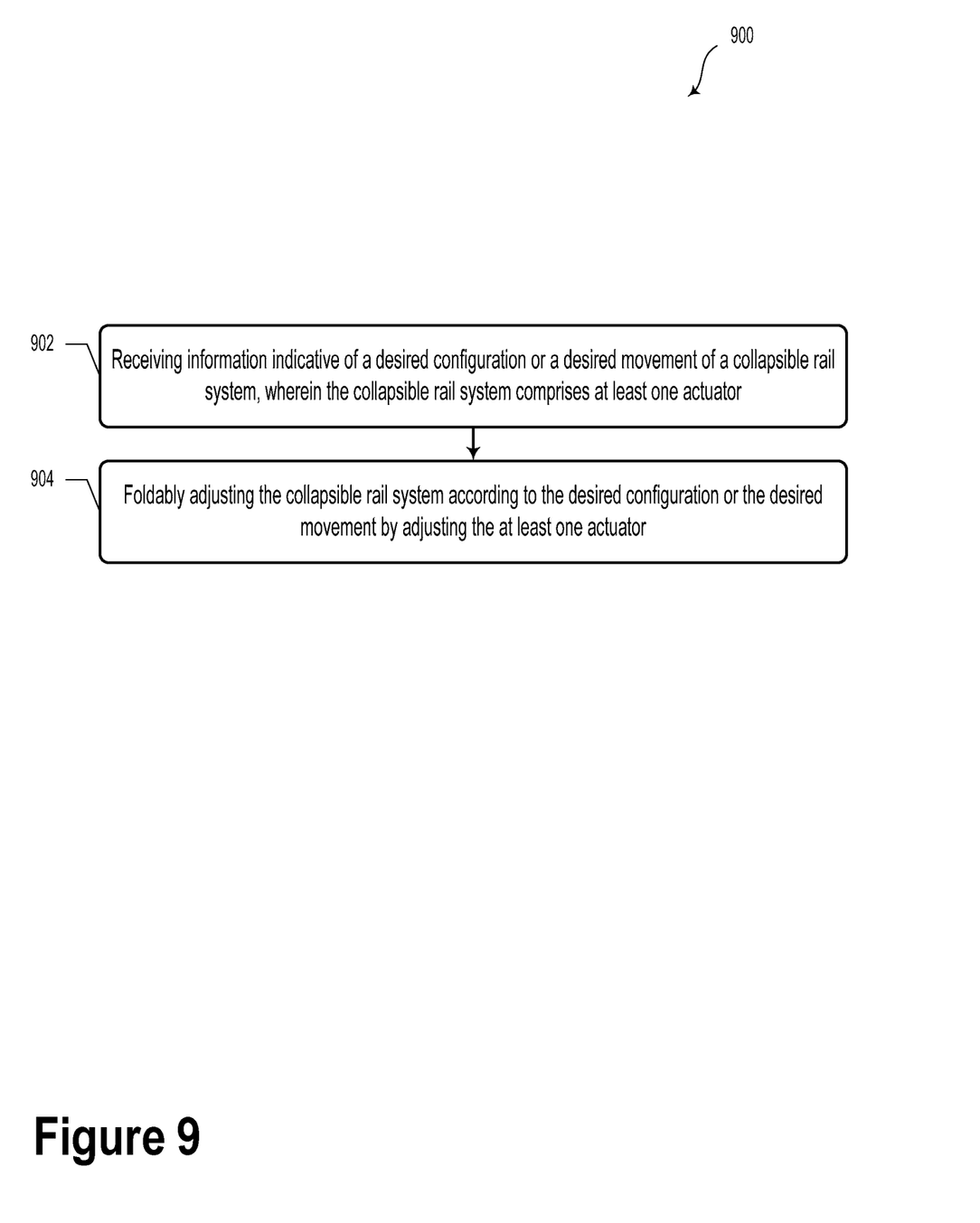
FIG. 9 illustrates a method, according to an example implementation.

FIG. 9 illustrates a method 900, according to an example implementation. Method 900 may involve elements of systems 100 or 200 as illustrated and described in reference to FIGS. 1 and 2. Additionally or alternatively, some or all elements of method 900 may relate to elements of FIGS. 3, 4, 5, 6, 7A, 7B, and 8. While FIG. 9 illustrates certain blocks or steps as following a specific order, it will be understood that some blocks or steps could be omitted and/or other blocks or steps could be included. Furthermore, the blocks or steps could be carried out in a different order, in parallel (e.g., concurrently), and/or repeated. In some embodiments, at least some blocks of method 900 could be carried out, at least in part, by controller 150, as illustrated and described in reference to FIG. 1.

Block 902 includes receiving information indicative of a desired configuration or a desired movement of a collapsible rail system. The collapsible rail system comprises at least one actuator (e.g., actuator 160). For example, some embodiments could include receiving, from a remote unit (e.g., remote controller 170 as illustrated and described in reference to FIG. 1), information indicative of a desired configuration or a desired movement of a collapsible rail system of a movable deck platform. The movable deck platform includes a walking surface.

The information about the desired configuration or the desired movement could include a signal from a user interaction, which could include a user pushing a button, touching a touchscreen, moving a switch, a voice command, etc. For example, the remote unit could include two buttons—a first button to extend the collapsible rail system and a second button to retract the collapsible rail system. In response to a user pushing the button to extend the collapsible rail system, the remote unit may transmit the desired movement (extend the collapsible rail system) to an actuator controller or another type of control system. Similarly, in response to a user pushing the button to retract the collapsible rail system, the remote unit may transmit the desired movement (retract the collapsible rail system) to an actuator controller or another type of control system. In some examples, the signal to retract or extend the collapsible rail system may be transmitted while the user is pushing the corresponding button on the remote unit. For instance, a user may be able to control an amount of rail system extension by releasing a button once the rail system has reached a desired configuration (e.g., particular top rail height, etc.).

In other examples, the received information could include a desired configuration (e.g., fully retracted collapsible rail system or fully extended collapsible rail system). In such scenarios, a user need only push the corresponding button (or touchscreen icon) once to provide a signal relating to the desired configuration.

The information about the desired configuration or the desired movement could also include a signal from a computing system. For example, the signal could include an automated retraction command or an automated extension command. Additionally or alternatively, the information about the desired configuration or the desired movement could be provided according to a predetermined schedule and/or based on a planned movement of an aircraft, personnel shift change, among other possibilities.

Block 904 includes foldably adjusting the collapsible rail system according to the desired configuration or the desired movement by adjusting the at least one actuator. In some embodiments, foldably adjusting the collapsible rail system could include raising a top rail (e.g., top rail 110) of the collapsible rail system by unfolding at least an upper primary member (e.g., upper primary member 132) and a lower primary member (e.g., lower primary member 134) of at least two posts (e.g., posts 130). The at least two posts couple the top rail to a walking surface.

Additionally or alternatively, foldably adjusting the collapsible rail system could include lowering the top rail of the collapsible rail system by folding at least the upper primary member and the lower primary member of the at least two posts.

In some embodiments, after fully lowering the top rail of the collapsible rail system into an enclosure (e.g., enclosure 140), method 900 could also include closing a cover door (e.g., cover door 180) of the enclosure.

Furthermore, in some embodiments, prior to or while raising the top rail of the collapsible rail system from an enclosure, method 900 could include opening a cover door of the enclosure.

In some embodiments, the method 900 may include determining that the desired configuration or the desired movement includes at least one of the extended configuration or retracted configuration. For example, the method 900 could include comparing the received information to values stored in a look up table or another type of stored value or configuration.

In such scenarios, method 900 may also include, responsive to determining that the desired configuration includes the extended configuration, causing an actuator (e.g., actuator 160 as illustrated and described with reference to FIG. 1) to move the collapsible rail system into the extended configuration. Furthermore, method 900 could include, responsive to determining that the desired configuration includes the retracted configuration, causing the actuator to move the collapsible rail system into the retracted configuration.

In some embodiments, method 900 could include receiving, from at least one limit switch, information indicative of the collapsible rail system and/or the actuator reaching a position limit. In such scenarios, method 900 could include, responsive to receiving the information indicative of the collapsible rail system and/or the actuator reaching a position limit, causing the actuator to stop moving the collapsible rail system. In some embodiments, the limit switch could include a pressure sensor or contact switch attached to at least one of the collapsible rail system or the actuator.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A collapsible guardrail system comprising:
a top rail having a first top rail end and a second top rail end;
a mid rail comprising at least one slot, a first mid rail end, a second mid rail end, and a locking structure;
an enclosure having a first enclosure end and a second enclosure end; and
at least two posts, wherein each post comprises:
an upper primary member;
a lower primary member;
an upper secondary member; and
a lower secondary member, wherein the upper primary member and the lower primary member are slidably coupled to the mid rail by way of a primary pin that engages the at least one slot, wherein the upper secondary member is rotatably coupled to the upper primary member, wherein the lower secondary member is rotatably coupled to the lower primary member, wherein the upper primary member is further coupled to the first top rail end or the second top rail end, wherein the lower primary member is further coupled to the first enclosure end or the second enclosure end, wherein the upper secondary member and the lower secondary member are rotatably coupled to the first mid rail end or the second mid rail end, wherein the collapsible guardrail system is configured to extend from a walking surface; and wherein at least one post further comprises a locking element, wherein the locking element is rotatably coupled to the primary pin, wherein the locking element is operable to engage the locking structure so as to lock the at least one post and disengage the locking structure so as to unlock the at least one post.

2. The collapsible guardrail system of claim 1, further comprising a controller having at least one processor and a memory, wherein the controller is configured to execute instructions so as to carry out operations, the operations comprising: causing the locking element to engage the locking structure and causing the locking element to disengage the locking structure.

3. The collapsible guardrail system of claim 1, further comprising at least one actuator, wherein the at least one actuator is coupled between the enclosure and the lower primary member.

4. The collapsible guardrail system of claim 3, wherein the at least one actuator comprises a pneumatic linear actuator, a hydraulic linear actuator, or a screw-type linear actuator.

5. The collapsible guardrail system of claim 3, wherein the at least one actuator comprises an electric ball-screw linear actuator comprising an actuator arm with a throw range between 100 mm to 300 mm.

6. The collapsible guardrail system of claim 3, further comprising a controller having at least one processor and a memory, wherein the controller is configured to execute instructions so as to carry out operations, the operations comprising: causing the at least one actuator to raise or lower the collapsible guardrail system.

7. The collapsible guardrail system of claim 6, further comprising a remote controller, wherein the operations comprise receiving a raise command or a lower command from the remote controller, wherein causing the at least one actuator to raise or lower the collapsible guardrail system is performed in response to receiving the raise command or the lower command.

8. The collapsible guardrail system of claim 1, wherein a walking surface defines a reference plane, wherein the collapsible guardrail system further comprises a cover door, wherein the cover door is rotatably coupled to the enclosure by way of a hinge, wherein while the collapsible guardrail system is moving into an extended configuration, the cover door rotates about the hinge and out of the reference plane, providing a kick plate, and wherein while the collapsible guardrail system is moving into a retracted configuration, the cover door rotates about the hinge and into the reference plane, covering the enclosure and retracted rail assembly.

9. The collapsible guardrail system of claim 1, wherein the walking surface defines a reference plane, wherein the at least two posts comprise a first post and a second post, wherein an extended configuration comprises the first post and the second post extending from the reference plane such that both the first post and the second post are substantially perpendicular to the reference plane, and wherein a retracted configuration comprises the first post and the second post folded substantially parallel to the reference plane.

10. The collapsible guardrail system of claim 9, wherein the top rail extends beyond a span between the first post and the second post to provide a wing rail.

11. The collapsible guardrail system of claim 1, further comprising a controller having at least one processor and a memory, wherein the controller is configured to execute instructions so as to carry out operations, the operations comprising: adjusting a configuration of the collapsible guardrail system between an extended configuration and a retracted configuration by foldably raising or lowering the collapsible guardrail system with respect to the enclosure.

12. A movable deck platform comprising:
a walking surface;
a top rail having a first top rail end and a second top rail end;
a mid rail comprising at least one slot, a first mid rail end, a second mid rail end, and a locking structure;
an enclosure coupled at or below the walking surface having a first enclosure end and a second enclosure end; and
at least two posts, wherein each post comprises:
an upper primary member;
a lower primary member;
an upper secondary member; and
a lower secondary member, wherein the upper primary member and the lower primary member are slidably coupled to the mid rail by way of a primary pin that engages the at least one slot, wherein the upper secondary member is rotatably coupled to the upper primary member, wherein the lower secondary member is rotatably coupled to the lower primary member, wherein the upper primary member is further coupled to the first top rail end or the second top rail end, wherein the lower primary member is further coupled to the first enclosure end or the second enclosure end, wherein the upper secondary member and the lower secondary member are rotatably coupled to the first mid rail end or the second mid rail end; wherein at least one post of the at least two posts further comprises a locking element, wherein the locking element is rotatably coupled to the primary pin, wherein the locking element is operable to engage the locking structure so as to lock at least one post and disengage the locking structure so as to unlock the at least one post.

13. The movable deck platform of claim 12, wherein the at least two posts comprise a first post and a second post, wherein an extended configuration comprises the first post and the second post extending from the walking surface such that both the first post and the second post are substantially perpendicular to the walking surface, and wherein a retracted configuration comprises the first post and the second post disposed substantially parallel to the walking surface.

14. The movable deck platform of claim 12, wherein the movable deck platform further comprises a controller having at least one processor and a memory, wherein the controller is configured to execute instructions so as to carry out operations, the operations comprising: causing the locking element to engage the locking structure and causing the locking element to disengage the locking structure.

15. The movable deck platform of claim 12, further comprising at least one actuator, wherein the at least one actuator is coupled between the enclosure and the lower primary member.

16. The movable deck platform of claim 15, wherein the at least one actuator comprises a pneumatic linear actuator, a hydraulic linear actuator, or a screw-type linear actuator.

17. The movable deck platform of claim 15, wherein the at least one actuator comprises an electric ball-screw linear actuator comprising an actuator arm with a throw range between 100 mm to 300 mm.

18. The movable deck platform of claim 12, further comprising:
   a remote controller; and
   a controller having at least one processor and a memory, wherein the controller is configured to execute instructions so as to carry out operations, the operations comprising:
   causing the at least one actuator to raise or lower the movable deck platform; and
   receiving a raise command or a lower command from the remote controller, wherein causing the at least one actuator to raise or lower the movable deck platform is performed in response to receiving the raise command or the lower command.

19. The movable deck platform of claim 12, wherein the top rail extends beyond a span between the first post and the second post to provide a wing rail.

\* \* \* \* \*